United States Patent [19]

Rabas

[11] 4,438,993

[45] Mar. 27, 1984

[54] DISPLAY CASE INCLUDING IMPROVED HINGE CONNECTION ARRANGEMENT

[75] Inventor: Kenneth J. Rabas, Waukesha, Wis.

[73] Assignee: DCI Marketing, Milwaukee, Wis.

[21] Appl. No.: 336,775

[22] Filed: Jan. 4, 1982

[51] Int. Cl.³ .......................... F16B 12/02; A47F 3/00

[52] U.S. Cl. ................................ 312/140; 312/257 A; 312/264; 16/267; 16/355; 49/397

[58] Field of Search .................... 312/257 A, 140, 138, 312/264, 265; 108/60; 16/248, 265, 267, 355; 49/397, 261

[56] References Cited

U.S. PATENT DOCUMENTS

| | | | |
|---|---|---|---|
| 2,302,661 | 11/1942 | Benson | 16/267 |
| 3,092,870 | 6/1963 | Baer | 16/277 |
| 3,240,545 | 3/1966 | Rulf | 312/264 |
| 3,402,422 | 9/1968 | Baer | 16/366 |
| 3,534,501 | 10/1970 | Carlsson et al. | 49/397 |
| 3,765,556 | 10/1973 | Baer | 220/1.5 |
| 4,110,946 | 9/1978 | Louther, Jr. | 312/264 |

FOREIGN PATENT DOCUMENTS

| | | | |
|---|---|---|---|
| 524228 | 8/1940 | United Kingdom | 16/355 |

*Primary Examiner*—William E. Lyddane
*Assistant Examiner*—Thomas A. Rendos

[57] ABSTRACT

A hinge comprising a first elongated hinge member defining an elongated socket and a second hinge member adapted to be positionable in a first angular position wherein at least a portion of the second hinge member is slidably insertable into the socket and slidably removable from the socket and a second angular position at an acute angle to the first angular position and wherein the second hinge member is restrained against removal from the socket. The first hinge member includes a supporting surface and a restraining member spaced from the supporting surface in opposed relation thereto and projecting toward the supporting surface. The restraining member includes a rodlike bearing surface facing the supporting surface, and the rodlike bearing surface and the supporting surface define the socket therebetween. The second hinge member includes an edge portion insertable into the socket when the second hinge member is in the first angular position and restrained against removal when the second hinge member is in the second angular position. The edge portion includes a concave curved bearing surface adapted to house the rodlike bearing surface and to pivot on the restraining member as the second hinge member moves from the first angular position to the second angular position.

7 Claims, 4 Drawing Figures

DISPLAY CASE INCLUDING IMPROVED HINGE CONNECTION ARRANGEMENT

FIELD OF THE INVENTION

The invention relates to merchandise display cases and the like for the use in retail sales and more particularly to hinges or connection apparatus and to apparatus which can be used to hold two panels together in edge-to-edge adjacent relation and to hingedly join these panels together.

BACKGROUND PRIOR ART

In the construction of merchandise display cases of the type employed in retail businesses it is convenient if such display cases can be readily assembled and disassembled in order that merchandise displays can be changed with a minimum of mechanical skill and labor. Accordingly it is desireable to construct the display cases of panels or modules which can be easily joined together and taken apart.

This invention also relates to hinges which can be used to join the edges of panels or the like together. An example of a typical prior art hinge arrangement is shown in the Baer U.S. Pat. No. 3,402,422, issued Sept. 24, 1968. Attention is also directed to structures shown in the Baer U.S. Pat. No. 3,092,870, issued June 11, 1963; and the Baer U.S. Pat. No. 3,765,556, issued Oct. 16, 1973.

SUMMARY OF THE INVENTION

The invention provides an improved merchandise display case which can be readily assembled and disassembled and also provides an improved hinge construction for joining structural components of a display case or the like together and in a manner which permits the various structural members such as panels of the display case to be rigidly joined yet to be quickly assembled or disassembled.

More particularly, the invention includes a hinge comprising a first hinge member defining a socket and a second hinge member adapted to be positionable in a first angular position wherein a portion of the second hinge member is slidably insertable into the socket and slidably removable from the socket and to be positionable in a second angular position wherein the second hinge member is restrained against removal from the socket. The first hinge member includes a supporting surface and a restraining member spaced from the supporting surface in opposed relation thereto. The restraining member projects toward the supporting surface and includes a rodlike bearing surface facing the supporting surface, the rodlike bearing surface and the supporting surface defining the socket therebetween. The second hinge member includes an edge portion, the edge being curved about an axis parallel to the edge and insertable into the socket when the second hinge member is in the first angular position and restrained against removal from the first hinge member when the second hinge member is in the second angular position. The curved edge includes opposite sides, one side defining a concave curved bearing surface adapted to house the rodlike bearing surface and to pivot on the restraining member as the second hinge member moves from the first angular position to the second angular position, and the other side defining a convex curved surface at least a portion of which is adapted to face the supporting surface.

The invention also includes a display case comprising a plurality of shelves for displaying merchandise, a pair of vertical end walls supporting the shelves, and a rear wall having vertical edges. Means also provided for pivotally and releasably joining at least one vertical edge of the rear wall to a rear edge of the end wall, the means for joining including a first hinge member joined to the rear edge of the end wall and defining a socket, and a second hinge member having one elongated vertical edge secured to the edge of the rear wall. The second hinge member is adapted to be positionable in a first angular position wherein the rear wall is positioned at an acute angle with respect to the end wall and wherein at least a portion of the second hinge member is slidably insertable into the socket. The second hinge member is also positionable in a second angular position wherein the rear wall is substantially perpendicular to the end wall and wherein the second hinge member is restrained against removal from the socket. The first hinge member includes a supporting surface and a restraining member spaced from the supporting surface in opposed relation thereto, the restraining member projecting toward the supporting surface and including a rodlike bearing surface facing the supporting surface, the rodlike bearing surface and the supporting surface defining the socket therebetween. The second hinge member includes an edge portion insertable into the socket when the second hinge member is in the first angular position and restrained against removal from the first hinge member when the second hinge member is in the second angular position. The edge portion is curved about an axis parallel to the edge and includes opposite sides, one of the sides defining a concave curved bearing surface adapted to house the rodlike bearing surface and to pivot on the restraining member as the second hinge member moves from the first angular position to the second angular position, and the other side defines a convex curved surface at least a portion of which is adapted to face the supporting surface.

Various other features and advantages of the invention will be apparent by refernce to the following description of a preferred embodiment, from the claims, and from the drawings.

Figure 1:
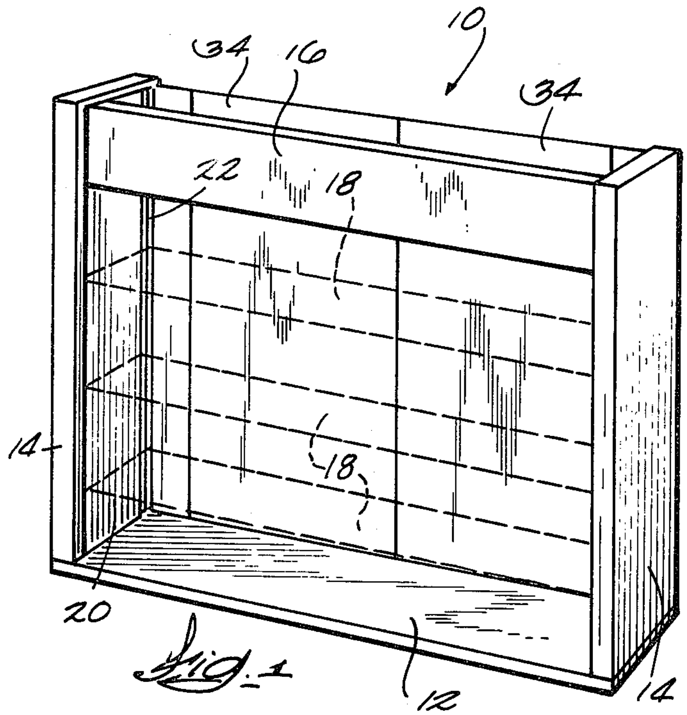
FIG. 1 is a perspective view of a display case embodying the invention.

Before describing a preferred embodiment of the invention in detail, it is to be understood that the invention is not limited in its application to the details of construction and to the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF A PREFERRED EMBODIMENT

Illustrated in FIG. 1 is a display case or cabinet 10 embodying the present invention and of the type adapted for use in a retail business for displaying merchandise. Generally, the display case 10 comprises a base or floor 12 and a pair of spaced end panels 14 extending upwardly from opposite ends of the base 12. While the floor 12 and end panels 14 can be comprised of any convenient material, in the particular construction shown, they can be comprised of a material such as wood or composite wood particles. In the illustrated construction a face plate 16 joins the upper portions of the spaced end panels 14, and the end panels 14 are adapted to support the opposite ends of display shelves 18. The display shelves 18 are intended to support merchandise for retail display, and the front of the display case 10 may be closed by glass panels.

Figure 2:
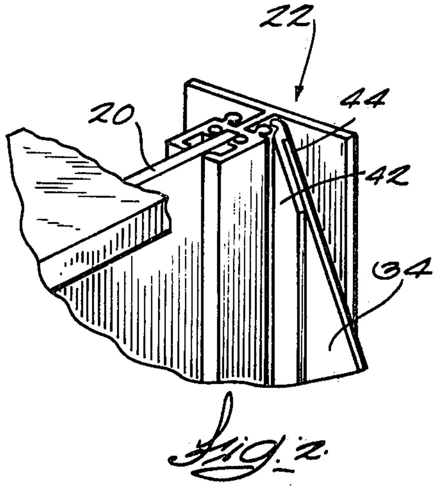
FIG. 2 is an enlarged perspective view of a portion of the apparatus illustrated in FIG. 1 and with portions of the apparatus broken away.
Figure 3:
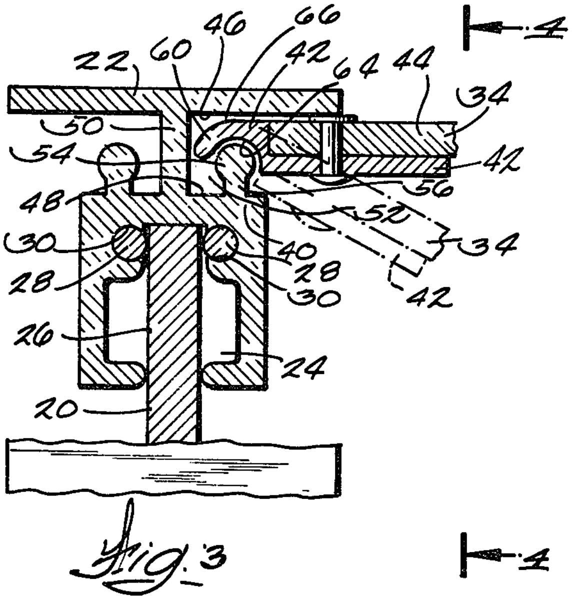
FIG. 3 is an enlarged cross section plan view of the apparatus illustrated in FIG. 1.

Referring more particularly to the end panels 14, in the illustrated construction, each end panel 14 is comprised of a plate member 20 joined to an elongated vertical frame member 22 best shown in FIGS. 2 and 3. While the vertical frame members 22 could be manufactured in various ways, in a preferred form of the invention, they each comprise an aluminum or plastic extrusion. The frame member 22 includes an elongated slot 24 which opens forwardly for housing the rearward vertical edge 26 of the plate member 20. As illustrated in the particular embodiment of the invention shown in FIG. 3, the frame member 22 further includes means for releasably restraining the plate 20 in the forwardly facing groove 24. The means for releasably restraining includes a pair of seals 28 positioned on opposite sides of the plate 20 and housed in elongated bores 30 formed in the opposite walls of the slot 24. When the edge 26 of the plate 20 is forced into the slot 24, the seals 28 are compressed and resiliently restrain the plate 20.

The display case 10 also includes a rear wall which is comprised, in the illustrated construction, of a pair of panels 34 arranged in edge-to-edge abutting relation, the panels 34 being constructed such that they can be easily joined to the vertical support members 22. While the panels 34 can have various constructions, in a preferred form of the invention, they are each relatively thin and comprised of wood, composite wood material, or plastic.

Means are also provided for joining the edges of the panels 34 to the vertical frame members 22 in such a manner that the edges of the rear panels 34 can be quickly joined to and disconnected from the frame members to thereby facilitate assembly and disassembly of the display case 10. Such means are provided by a hinge assembly which includes a first elongated hinge member 40 comprising an integral portion of the vertical frame member 22 and a second elongated hinge member 42 which is secured to the vertical edge 44 of the panel 34 and which cooperates with the first hinge member 40.

While the hinge assembly is described as being applicable to join the rear panel 34 to the vertical member 22 in the construction of the display case 10, it should be understood that the hinge assembly has a variety of other uses and is not limited to the particular application illustrated in the drawings. For example, while the hinge assembly is shown as joining a rear panel 34 of the display case 10 to an end panel 14, it should be noted that a similar structure could be employed to join together two panels in adjacent edge-to-edge coplanar relation. For example, the vertical member 22 is shown as defining a pair of first hinge members 40, each adapted to house a second hinge member 42. Panels 34 could thus be joined together in edge-to-edge relation in series so as to form a continuous planar wall.

Referring more particularly to the construction of the hinge assembly illustrated in the particular embodiment described here, the first elongated hinge member 40 includes a pair of spaced apart surfaces 46 and 48 joined by an integral transverse member 50 and defining an elongated channel 52. An elongated rodlike bearing member 54 is housed between the surfaces 46 and 48 and extends along the length of the channel 50, the rodlike bearing member 54 being joined to the surface 48 by a web 56. The rodlike bearing member 54 includes a smooth rounded generally cylindrical surface such that it can function as a bearing surface for supporting the second hinge member 42 for pivotal movement thereon. The rodlike bearing member 54 is spaced from the surface 46 so as to define a space or socket therebetween for housing the edge portion 60 of the second hinge member.

The second hinge member 42 comprises an elongated strip adapted to be secured to the edge 44 of the panel 34. For purposes of illustration, in the construction shown in FIG. 3, the second hinge member 42 is shown as being secured to the edge 44 of the panel 34 by rivets. The strip 42 includes a curved edge portion 60 which is adapted to be slidably insertable between the rodlike member 54 and the supporting surface 46 when the panel 34 is supported in the first angular position illustrated in FIG. 2 and in phantom in FIG. 3. The curved edge 60 also defines an elongated generally semi-cylindrical socket or bearing surface 64 adapted to house a portion of the rodlike bearing member 54, and the second hinge member 42 is adapted to be pivotable on the rodlike bearing member 54 from the position shown in phantom in FIG. 3 to the solid line position. Referring more particularly to the configuration of the curved edge 60 of the second hinge member 42, when it is viewed in cross section as in FIG. 3, it is seen to have an outer curved surface 66 adapted to be positionable adjacent the supporting surface 46 of the first hinge member 40 and to have an inner curved surface 64 adapted to engage the rodlike bearing member 54. The inner and outer curved surfaces 64 and 66 respectively, are curved about a common axis and the inner curved surface 64 forms an arc of somewhat less than 180°.

During assembly of the display case 10 illustrated in FIG. 1, the end walls 14 are secured to the floor or base member 12. The rear panel 34 is then positioned as is shown in phantom in FIG. 3 with the edge 60 of the second hinge member 42 being insertable into the opening between the rodlike member 54 and the opposed supporting surface 46. The panel 34 is then pivoted to the position shown in solid lines in FIG. 3 wherein a rearward surface of the panel 34 and a rearward surface of the edge portion 60 of the second hinge member 42 engage the supporting surface 46 in face-to-face relation. As the rear panel 34 is pivoted from the phantom position to the solid line position of FIG. 3 the curved edge 60 of the second hinge member 42 moves around the rodlike member 54, and the panel 34 will be prevented from being moved away from the first hinge member 40 in a direction parallel to the supporting surface 46 since the end of the curved member 60 will engage the rodlike member 54 to restrain it against movement. The supporting surface 46 also prevents pivotal movement of the second hinge member 42 and the panel 34 beyond the position wherein the rearward surface of the panel 34 is generally coplanar with the supporting surface 46.

Figure 4:
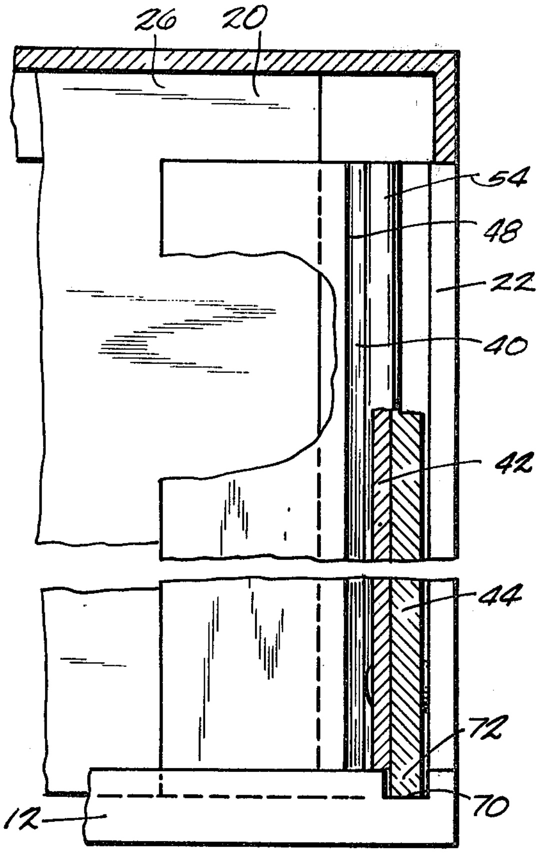
FIG. 4 is a cross section view taken along line 4—4 in FIG. 3.

As illustrated in FIG. 4, the rearward portion of the upper surface of the floor or base member 12 is provided with an elongated groove 70 parallel to the rearward edge of the base member 12, the elongated groove 70 being adapted to house the lower edge 72 of the rear panel 34. During assembly of the display case 10, when the rear panel 34 is moved to the solid line position shown in FIG. 3 wherein the rear panels are in coplanar alignment, the lower edge 72 of the panel 34 can drop into the groove 70 so as to further secure the rearward panel 34 against pivotal movement about the bearing defined by the rodlike member 54. This further restrains the panels 34 from pivotal movement with respect to the first hinge member 40 and the end walls 14 to provide further rigidity to the display case 10. Such vertical movement of the panels 34 such that they can slide into the slot 70 is provided by the facility of the second hinge member to slide longitudinally with respect to the first hinge member.

Various features of the invention are set forth in the following claims.

I claim:

1. A display case comprising a plurality of shelves for displaying merchandise, a pair of vertical end walls supporting said shelves, said end walls each including a rearward edge, a rear wall having vertical edges, and means for pivotally and releasably joining at least one vertical edge of said rear wall to said rearward edge of one of said end walls, said means for joining including a first hinge member including a supporting surface and a restraining member spaced from said supporting surface in opposed relation thereto, said restraining member projecting toward said supporting surface and including a rodlike bearing surface facing said supporting surface, said rodlike bearing surface and said supporting surface defining a socket therebetween, an insertable hinge member having one elongated vertical edge secured to said edge of said rear wall, said insertable hinge member being adapted to be positionable in a first angular position wherein said rear wall is positioned at an acute angle with respect to said end wall and wherein at least a portion of said insertable hinge member is slideably insertable into said socket and slideably removable from said socket and adapted to be positionable in a second angular position wherein said rear wall is substantially perpendicular to said end wall and wherein said portion of said insertable hinge member is restrained against removal from said socket, said insertable hinge member including an edge portion insertable into said socket when said insertable hinge member is in said first angular position and restrained against removal from said first hinge member when said insertable hinge member is in said second angular position, said edge being curved about an axis parallel to said edge, said curved edge including opposite sides, one of said sides defining a concave curved bearing surface adapted to house said restraining member and to pivot on said restraining member as said insertable hinge member moves from said first angular position to said second angular position, and the other side defining a convex curved surface at least a portion of which is adapted to face said supporting surface, and a channel integrally joined to said socket portion, said channel defining an elongated slot slideably receiving said rearward edge of said end wall and supporting said end wall in substantially perpendicular relation to said rear wall.

2. A display case as set forth in claim 1 wherein said rear wall includes a pair of panels in coplanar relation, one of said panels including a vertical edge forming said vertical edge of said rear wall.

3. A display case as set forth in claim 1 wherein said first hinge member further includes a first socket portion and a second socket portion integrally joined in back-to-back relation, with one of said first and second socket portions defining said socket.

4. An elongated hinge assembly adapted to join two panels in adjacent edge-to-edge coplanar relation, and to join a third panel in substantially perpendicular relation to said two panels, said hinge assembly comprising a first hinge member including a first socket portion and a second socket portion integrally joined in back-to-back relation, said first socket portion including a supporting surface and a restraining member spaced from said supporting surface in opposed relation thereto, said restraining member projecting toward said supporting surface and including a rodlike bearing surface facing said supporting surface, said rodlike bearing surface and said supporting surface defining a first socket therebetween, said second socket portion including a supporting surface and a restraining member spaced from said supporting surface in opposed relation thereto, said restraining member projecting toward said supporting surface and including a rodlike bearing surface facing said supporting surface, said rodlike bearing surface and said supporting surface defining a second socket therebetween, a first insertable hinge member received in said first socket, said first insertable hinge member being adapted to be attached to the edge of one of said two panels, said first insertable hinge member being adapted to be positionable in a first angular position wherein at least a portion of said first insertable hinge member is slideably insertable into said first socket and slideably removable from said first socket and adapted to be positionable in a second angular position at an acute angle to said first angular position and wherein said portion of said first insertable hinge member is restrained against removal from said first socket, and first insertable hinge member including an edge portion insertable into said first socket when said first insertable hinge member is in said first angular position and restrained against removal from said first socket when said first insertable hinge member is in said second angular position, said edge being curved about an axis parallel to said edge, said curved edge including opposite sides, one of said sides defining a concave curved bearing surface adapted to house said restraining member and to pivot on said restraining member as said first insertable hinge member moves from said first angular position to said second angular position, and the other side defining a convex curved surface at least a portion of which is adapted to face said supporting surface, and a channel integrally joined to said first and second socket portions, said channel defining an elongated slot adapted to slideably receive an edge of said third panel and to support said third panel in substantially perpendicular relation to said two panels in adjacent edge-to-edge coplanar relation.

5. A hinge assembly as set forth in claim 4 wherein said first insertable hinge member includes a planar surface portion adjacent said convex curved surface, wherein said supporting surface is planar, and wherein said planar surface portion defines an acute angle with respect to said planar supporting surface when said first insertable hinge member is in said first angular position and wherein said planar surface portion is positioned closely adjacent said supporting surface in face-to-face relation when said first insertable hinge member is in said second angular position.

6. An elongated hinge assembly adapted to join two panels in substantially perpendicular relation, said hinge assembly comprising a first hinge member including a supporting surface and a restraining member spaced from said supporting surface in opposed relation thereto, said restraining member projecting toward said supporting surface and including a rodlike bearing surface facing said supporting surface, said rodlike bearing surface and said supporting surface defining a socket therebetween, an insertable hinge member adapted to be attached to the edge of a first panel, adapted to be positionable in a first angular position wherein at least a portion of said insertable hinge member is slideably inserted into said socket and slideably removable from said socket, and adapted to be positionable in a second angular position at an acute angle to said first angular position and wherein said portion of said insertable hinge member is restrained against removal from said socket, said insertable hinge member including an edge portion insertable into said socket when said insertable hinge member is in said first angular position and restrained against removal from said first hinge member when said insertable hinge member is in said second angular position, said edge being curved about an axis parallel to said edge, said curved edge including opposite sides, one of said sides defining a concave curved bearing surface adapted to house said restraining member and to pivot on said restraining member as said insertable hinge member moves from said first angular position to said second angular position, and the other side defining a convex curved surface at least a portion of which is adapted to face said supporting surface, and a channel integrally joined to said first hinge member, said channel defining an elongated slot adapted to slideably receive an edge of a second panel and to support said second panel in substantially perpendicular relationship to said first panel.

7. A hinge assembly as set forth in claim 6 wherein said supporting surface is planar, and wherein said insertable hinge member includes a planar surface portion adjacent said convex curved surface, and wherein said planar surface portion defines an acute angle with respect to said planar supporting surface when said insertable hinge member is in said first angular position and wherein said planar surface portion abuts said supporting surface in face-to-face relation when said insertable hinge member is in said second angular position.

* * * * *